United States Patent [19]

Shibano et al.

[11] Patent Number: 4,636,432

[45] Date of Patent: Jan. 13, 1987

[54] PRESSURE SENSITIVE-ADHESIVE TAPES OR SHEETS

[75] Inventors: Tomishi Shibano, Tama; Itsuo Kimura; Sachio Maruchi, both of Tokyo, all of Japan

[73] Assignee: Sanyo-Kokusaku Pulp Co., Ltd., Tokyo, Japan

[21] Appl. No.: 697,915

[22] Filed: Feb. 4, 1985

[51] Int. Cl.⁴ .............................. B32B 5/16; C09J 7/02
[52] U.S. Cl. ..................................... 428/327; 428/352; 428/354; 428/534; 428/535; 428/536
[58] Field of Search .................. 428/327, 40, 41, 352, 428/354, 536, 534, 535

[56] References Cited

U.S. PATENT DOCUMENTS

| | | | |
|---|---|---|---|
| 4,187,219 | 2/1980 | Maher | 428/207 X |
| 4,456,643 | 6/1984 | Colyer | 428/327 X |
| 4,513,059 | 4/1985 | Dabroski | 428/352 X |
| 4,514,457 | 4/1985 | Sasaki | 428/352 X |
| 4,530,872 | 7/1985 | Pernicano | 428/327 X |

*Primary Examiner*—Thomas J. Herbert
*Attorney, Agent, or Firm*—Oblon, Fisher, Spivak, McClelland, & Maier

[57] ABSTRACT

A pressure-sensitive adhesive tape or sheet including a paper substrate, a release layer provided on at least one side of said substrate and comprising modified starch and/or starch, and a pressure-sensitive adhesive mass layer provided with respect to said release layer and containing an elastomeric polymer microspheres, said pressure-sensitive adhesive tape or sheet having an adhesion of no more than 150 g/cm.

4 Claims, 7 Drawing Figures

PRESSURE SENSITIVE-ADHESIVE TAPES OR SHEETS

FIELD OF THE INVENTION

The present invention relates to a pressure-sensitive adhesive tape or sheet of relatively low adhesion.

BACKGROUND INFORMATION OF THE INVENTION

In general, the pressure-sensitive adhesive (hereinafter referred to as PSA) tapes or sheets are of the structure as illustrated in FIG. 1 or 2. More specifically, FIG. 1 is a schematically sectional view of a PSA tape or a PSA sheet free from any release liner and FIG. 2 is a schematically sectional view of a PSA sheet including a release liner. In the drawings, reference numeral I is a PSA tape or sheet supporting substrate, II a release liner supporting substrate, III a PSA sheet surface member, IV a PSA mass layer, V a release layer, and VI is a release liner.

With the aforesaid PSA tape or sheet, in most cases, silicone is generally used for the release layer thereof. However, the use of silicone offers the following problems:

(1) When the PSA mass used in the PSA tape or sheet has a relatively low adhesion (e.g., on the order of no more than 150 g/cm), the adhesive tape or sheet may separate spontaneously from the release layer prior to the use thereof. This is due to excessive release properties of silicone. In consequence, the release layer loses its own function that it should protect the PSA layer, so that the PSA layer may be contaminated.

(2) Difficulty is involved in marking the back surface of the PSA tape or the silicone-treated surface of the PSA sheet free from any release liner with oil ink, water ink, ball-pointed pens, pencils etc. due to their water- and oil-repellency.

It is noted that the release agents embrace, in addition to silicone, shellac, long-chain alkyl compounds, alkyd resin, etc. However, even when these agents are used, there is left much to be desired in respect of ink receptivity, although that receptivity is slightly improved, compared with the use of silicone. It is also difficult to obtain good releasability.

SUMMARY OF THE INVENTION

A main object of the present invention is to provide a solution to the aforesaid problems.

According to the present invention, this object is achieved by combining modified starch and/or starch, which are used for the release layer in lieu of silicone, with a PSA mass containing an elastomeric polymer microspheres, which is used as the PSA layer to be provided with respect to the release layer.

More specifically, the present invention provides a novel PSA tape or sheet including a release layer comprising modified starch and/or starch on at least one surface of a paper substrate, and a PSA layer to be provided onto said release layer, said PSA layer containing an elastomeric polymer microsphere, and having an adhesion of no more than 150 g/cm.

According to another object of the present invention, the main component of the PSA mass has a glass transition temperature of less than $-50°$ C., as measured with DSC (differential scanning calorimeter).

The PSA tape or sheet according to the present invention possesses a suitable degree of releasability sufficient to prevent spontaneous separation thereof from the release layer, and has its release-treated surface to be appropriately marked with oil ink, water ink, ball-pointed pens, pencils etc.

BRIEF DESCRIPTION OF THE DRAWINGS

The aforesaid and other objects and features of the present invention will become apparent from a reading of the following detailed description with reference to the accompanying drawings, which are given for the purpose of illustration alone, and in which.

DETAILED EXPLANATION OF THE INVENTION

Figure 1:
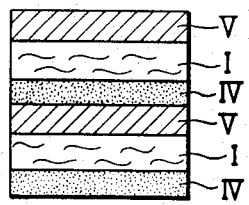
FIGS. 1 and 2 are schematical sections showing the prior art general PSA tapes or sheets, FIGS. 3 to 5 inclusive are schematical sections showing the typical PSA tapes or sheets according to the present invention.
Figure 2:
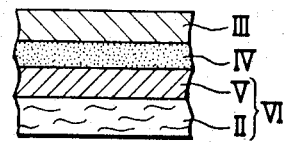
Figure 3:
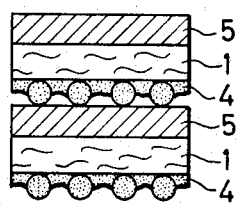
Figure 4:
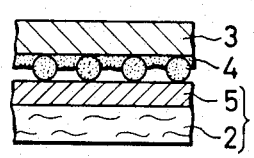
Figure 5:
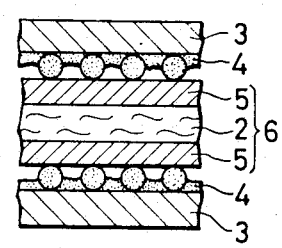
Figure 6:
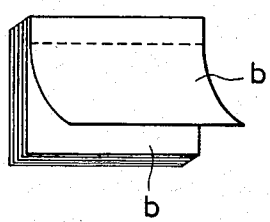
FIG. 6 is a schematical view showing one example of the PSA sheet according to the present invention, i.e. a PSA sheet in the form of a memo pad, wherein a PSA mass is partly applied at the upper end.
Figure 7:
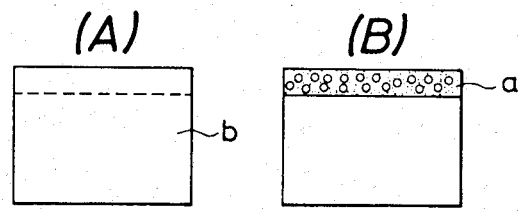
FIG. 7 is a plan view showing one side (A) and the other side (B) of the adhesive sheet of FIG. 6.

Referring now to FIGS. 3 to 7 inclusive showing the embodiments of the present invention, reference numeral 1 is a PSA tape or sheet supporting paper substrate, 2 a release liner supporting paper substrate, 3 a PSA sheet surface member, 4 a PSA layer containing an elastomeric polymer microspheres, 5 a release layer comprising modified starch and/or starch, and 6 is a release liner consisting of the paper 2 and the release layer 5. A small letter a stands for PSA layer side, and b indicates a release layer side.

In the present invention, modified starch and/or starch are used for the release layer. As the modified starch use may be made of alpha-starch, dextrin, oxidized starch, esterified starch, etherified starch and cationic starch alone or in combination. Among others, the most preference is given oxidized starch and hydroxyethylated starch.

It is desired that the release layer has a thickness of no less than 0.5 microns, preferably 1 to 5 microns.

The release layer may contain water resistant agents, stabilizers, barrier properties-improving agents, anti-blocking agents, dyes, pigments, etc., as long as they do not interfere with the thereof.

It is required in the present invention that use be made of a PSA mass containing an elastomeric polymer microspheres. If the PSA mass contains no elastomeric polymer microspheres, then it shows no good releasability to the modified starch and/or starch.

The PSA tape or sheet should have a normal-state adhesion of no more than 150 g/cm, as measured according to the stipulation of JIS Z1523. As an adhesion exceeding 150 g/cm, difficulty is encountered in the achievement of good releasability, and the supporting paper is easily peeled off.

The elastomeric polymer microspheres used include polyacrylates, natural rubber, SBR, polyisoprene, polybutadiene, styrene/butadiene/acrylate ternary copolymers, etc. Preferably, that polymer has a mean particle size of 10 to 100 microns.

The main component of the PSA mass has a glass transition temperature of no more than $-50°$ C., preferably $-70°$ C. to $-90°$ C. A glass transition temperature of higher than −50° C. is undesired in respect of releasability.

In addition to the minute and spherical elastomer polymer, the adhesive mass may contain polyacrylates, polyacrylic acid, SBR, styrene/acrylate copolymers, styrene/butadiene/acrylate ternary copolymers, polyvinyl acetate, gelatin, glue, casein, etc. alone or in combination. It is suitable that the amount of coating of the adhesive mass is 3 to 30 g/m² (calculated as solid matter).

The adhesive mass may be coated entirely onto the application side, or partly onto the application side, as illustrated in FIG. 7(B).

The paper used in the present invention may be that ordinarily used, such as wood free paper, kraft paper, glassine paper, inorganic fiber-filled paper, plastic-filled paper, etc.

It is noted that the aforesaid paper may previously be provided with an adhesion-improving layer for the purpose of improving adhesion of that paper to the adhesive mass.

The present invention will now be explained in further detail with reference to the following non-restrictive examples.

EXAMPLE 1

Wood free paper 1 of a weight of 78 g/m² was provided on one side with a release layer 5 comprising oxidized starch, and was applied on the other side with an adhesive mass 4 containing a minute and spherical elastomer polymer based on polyacrylate to prepare a PSA tape having an adhesion of 60 g/cm. With this tape having a suitable degree of releasability, no spontaneous separation of the adhesive surface from the release layer took place. Nor did any peeling-off of the supporting paper occur during application. The adhesive tape could further be marked on the back surface with Magic ink, water ink, ball-pointed pens, pencils, etc.

COMPARISON EXAMPLE 1

To prepare a PSA tape, Example 1 was repeated, provided that silicone was used for a release layer. As a result of examining the performance of that tape, it has been found that its releasability is excessive that the adhesive surface separates spontaneously from the release layer.

That tape could not be marked on the back surface with Magic ink, water ink or ball-pointed pens due to ink repellency.

COMPARISON EXAMPLE 2

To prepare a PSA tape, Example 1 was repeated without using any release layer. That tape had so reduced a releasability that ply separation took place due to peeling-off off the supporting paper during application.

The measuring methods applied in the present invention are given below:

(1) ADHESION: According to the normal-state adhesion measuring method as stipulated in JIS Z1523.

(2) MEASUREMENT OF GLASS TRANSITION TEMPERATURE WITH DSC: The glass transition temperature was measured under the following conditions with a low-temperature type differential scanning calorimeter, manufactured by Rigaku Denki K.K.
Amount of Sample: 18–20 mg
Pan: Aluminium
Atmosphere: Air
Heating Rate: 10° C./min.
Reference substance: Alumina.

What is claimed is:

1. A pressure-sensitive adhesive tape or sheet comprising a paper substrate, a release layer provided on at least one side of said substrate and comprising modified starch and/or starch, and a pressure-sensitive adhesive mass layer provided on the substrate side opposite to said release layer and containing elastomeric polymer microspheres, said pressure-sensitive adhesive tape or sheet having an adhesion of no more than 150 g/cm.

2. The tape or sheet as defined in claim 1, in which the main component of said pressure-sensitive adhesive mass has a glass transition temperature of no more than −50° C., as measured with DSC (differential scanning calorimeter).

3. The tape or sheet as defined in claim 1, in which the modified starch and/or starch is selected from the group consisting of starch, alpha-starch, dextrin, oxidized starch, esterified starch, etherified starch, cationic starch and mixtures thereof.

4. The tape or sheet as defined in claim 1, in which the elastomeric polymer microspheres are of a polymer selected from the group consisting of polyacrylate, natural rubber, SBR, polyisoprene, polybutadiene, and styrene/butadiene/acrylate ternary copolymer, and the microspheres have a means particle size of 10 to 100 microns.

* * * * *